US009002818B2

(12) United States Patent
Ozonat et al.

(10) Patent No.: US 9,002,818 B2
(45) Date of Patent: Apr. 7, 2015

(54) CALCULATING A CONTENT SUBSET

(71) Applicant: Hewlett-Packard Development Company, L.P., Houston, TX (US)

(72) Inventors: Mehmet Kivanc Ozonat, San Jose, CA (US); Claudio Bartolini, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 13/755,492

(22) Filed: Jan. 31, 2013

(65) Prior Publication Data
US 2014/0214789 A1 Jul. 31, 2014

(51) Int. Cl.
*G06F 7/00* (2006.01)
*G06F 17/30* (2006.01)

(52) U.S. Cl.
CPC .............. *G06F 17/30873* (2013.01)

(58) Field of Classification Search
CPC ............ G06F 17/30861; G06F 17/30864; G06F 17/30867; G06F 17/30887
USPC ......................... 707/706, 709, 710
See application file for complete search history.

(56) References Cited

U.S. PATENT DOCUMENTS

| 6,549,896 | B1 * | 4/2003 | Candan et al. ......... 707/999.002 |
| 7,542,970 | B2 | 6/2009 | Holmes et al. |
| 7,882,099 | B2 | 2/2011 | Agrawal et al. |
| 2002/0052928 | A1 | 5/2002 | Stern et al. |
| 2007/0185896 | A1 * | 8/2007 | Jagannath et al. ............ 707/102 |
| 2008/0168041 | A1 * | 7/2008 | Joshi et al. ........... 707/3 |
| 2011/0093481 | A1 * | 4/2011 | Hussam .................. 707/756 |
| 2012/0036580 | A1 * | 2/2012 | Gorny et al. ................ 726/25 |
| 2012/0143844 | A1 | 6/2012 | Wang et al. |
| 2013/0212109 | A1 * | 8/2013 | Evancich et al. ............ 707/740 |

OTHER PUBLICATIONS

Riskin, "Optimal Bit Allocation via the Generalized BFOS Algorithm", IEEE, 1990. Download: http://ieeexplore.ieee.org/stamp/stamp.jsp?arnumber=75264.*
Ntoulas, A., "Crawling and Searching the Hidden Web," University of California, Los Angeles, Aug. 7, 2006, 268 pages.
Davidov, et al., "Multiple-goal Heuristic Search," Journal of Artificial Intelligence Research 26, Aug. 2006, pp. 417-451.
Chakrabarti, et al., "Accelerated Focused Crawling through Online Relevance Feedback," The Eleventh International World Wide Web Conference 2002, Honalulu, Hawaii, May 7-11, 2002, 12 pages.
Ozonat, et al., "Context-Dependent Tree-Structured Image Classification Using the QDA Distortion Measure and the Hidden Markov Model," International Conference on Image Processing, ICIP '04, Oct. 24-27, 2007, vol. 3, pp. 1887-1890.
Cope, et al., "Automated Discovery of Search Interfaces on the Web," Proceedings of the 14th Australasian Database Conference (ADC2003), Adelaide, Australia, Feb. 2003, 9 pages.

(Continued)

*Primary Examiner* — Hares Jami
(74) *Attorney, Agent, or Firm* — Brooks, Cameron & Huebsch, PLLC

(57) ABSTRACT

A method for calculating a content subset can include crawling a number of webpages for content, determining a relevance to a particular domain of the content, determining a penalty value for each of the number of webpages; and calculating, utilizing a data tree-based model, a subset of the content to analyze based on the relevance and the penalty value.

15 Claims, 4 Drawing Sheets

(56) References Cited

OTHER PUBLICATIONS

Chakrabarti, et al., "Focused crawling: a new approach to topic-specific Web resource discovery," Proceedings of 8th International World Wide Web Conference, May 11-14, 1999, pp. 545-562.

Diligenti, et al., "Focused Crawling Using Context Graphs," Proceedings of the 26th International Conference on Very Large Databases, Sep. 10-14, 2000, Cairo Egypt, pp. 527-534.

Barbosa, et al., "Searching for Hidden-Web Databases," Proceedings of the 8th International Workshop on the Web and Databases (WebDB 2005), Baltimore, Maryland, USA, Jun. 2005, 26 pages.

* cited by examiner

CALCULATING A CONTENT SUBSET

BACKGROUND

Crawling and retrieval of web content can include browsing the World Wide Web in a methodical and/or orderly fashion to create a copy of visited pages for later processing by a search engine. However, due to the current size of the Web, search engines cannot index the entire Web.

Prior approaches to crawling and retrieving web content include the use of focused web crawlers. A focused web crawler estimates a probability of a visited page being relevant to a focus topic and retrieves a link corresponding to the page only if a target probability is reached; however, a focus web crawler may not retrieve a sufficient number of links or sufficiently relevant links. For example, a focus web crawler can download only a fraction of Web pages visited.

DETAILED DESCRIPTION

Figure 1:
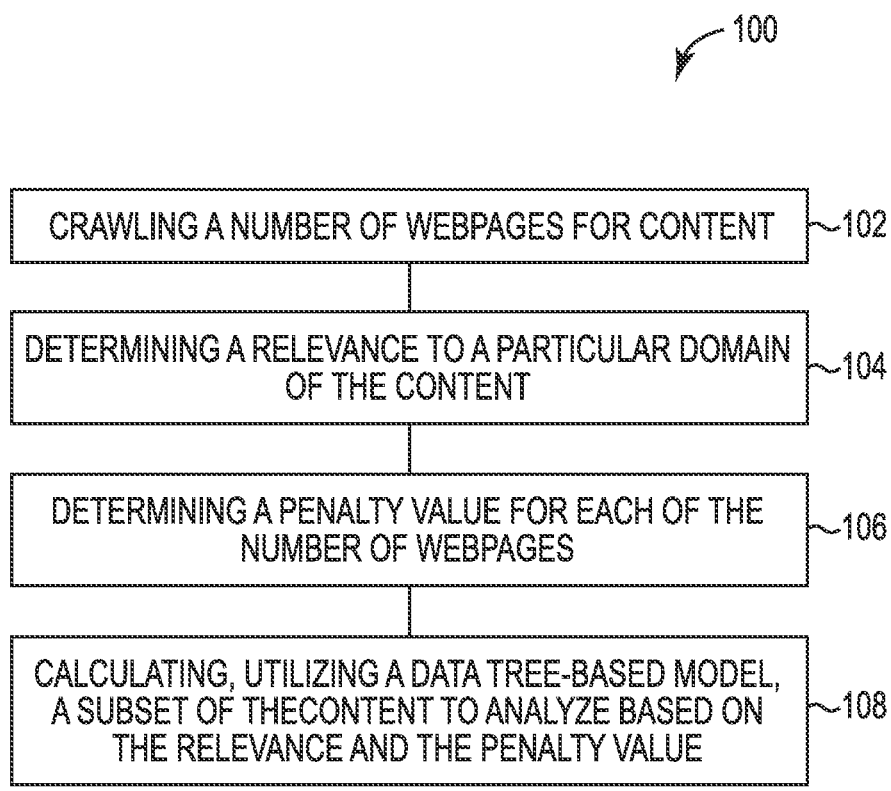
FIG. 1 is a block diagram illustrating an example of a method for analyzing content according to the present disclosure.

The crawling and retrieval of content (e.g., web content) using statistical techniques have been explored in previous approaches to content analysis. For example, one approach taken has been the use of focused web crawlers. A focused web crawler does not retrieve links from every visited web page; instead, it estimates a probability of the visited page being relevant to the focus topic, and retrieves the links only if the probability is sufficiently high.

A supervised page classifier may be used to estimate the probability that a page is relevant to the focus topic. A special case of focused web crawlers is a form-focused web crawler, which may be designed to focus on and retrieve web forms. The form-focused web crawler consists of a form classifier in addition to a page classifier. The form classifier is used to distinguish forms from non-forms based on form tags. However, the accuracy of focused crawlers, including form-focused crawlers, is low in terms of retrieving relevant forms. For instance, a form-focused crawler may be approximately 16 percent accurate.

Analyzing content can be time-consuming when a repository of content (e.g., webpages) is to be analyzed. For example, the larger the repository, the longer it takes to analyze it. In a number of examples of the present disclosure, a subset (e.g., a sub-repository of webpages) of content retrieved through crawling links (e.g., web links) can be determined, so that analytics can be applied to the subset (e.g., rather than the entire set), while maintaining target (e.g., desired) analytics results. By reducing the content (e.g., number of webpages) analyzed, analysis time can be reduced to a target time period.

Examples of the present disclosure may include methods, systems, and computer-readable and executable instructions and/or logic. An example method for calculating a content subset can include crawling a number of webpages for content, determining a relevance to a particular domain of the content, determining a penalty value for each of the number of webpages, and calculating, utilizing a data tree-based model, a subset of the content to analyze based on the relevance and the penalty value.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designators "N", "P," "R", and "S" particularly with respect to reference numerals in the drawings, indicate that a number of the particular feature so designated can be included with a number of examples of the present disclosure. Also, as used herein, "a number of" an element and/or feature can refer to one or more of such elements and/or features.

FIG. 1 is a block diagram illustrating an example of a method 100 for calculating a content subset according to the present disclosure. Calculating a content subset can include, for example, calculating, utilizing a data tree-based model, a subset of content from a repository of content retrieved through crawling links. The subset (e.g., a sub-repository of webpages) can be analyzed, instead of the entire repository, for example, resulting in target (e.g., desired) analytics results within a particular target timeframe.

At 102, a number of webpages are crawled for content. The webpages can include web links, publications, and/or forums, among others. In a number of examples, the webpages can be crawled using a crawler. A crawler, for example, may scan a number of webpages, a number of web links, and/or a network, among others, and extract content (e.g., data). A crawler, as used herein, can be an application and/or a program such as a web crawler, a web spider, and/or other probe that continually and/or periodically scans the webpage, web link, network, etc. to collect content. The crawler may scan a number of webpages, web links, networks, etc. in an orderly, automated manner, and collect content. A crawler can include computer-readable instructions executed by a processor to crawl a number of webpages, for example.

Crawling webpages can include, for example, crawling of medical domains over the web. For example, retrieving target (e.g., relevant) medical content can be used in tasks such as creating medical ontologies, discovering discussions in medical forums relevant to a patient's clinical data, and/or discovering medical articles relevant to a patient's clinical data, among others. In some examples, medical content and/or medical text can be automatically mapped (e.g., patient clinical data to medical articles) utilizing the retrieved content.

At 104, a relevance to a particular domain of the content is determined. A relevance can include, for example, a relationship to a target (e.g., focus topic). The relevance can depend on the domain, and there may be a number of ways to determine the relevance, such as, by comparing keywords and forming relevance scores. For example, content within a webpage about broken bones may be relevant to a patient's clinical data if the patient has a broken bone, but may not be relevant if the patient suffers from the flu. If the phrase "broken bone" appears on the crawled page, one might increase the relevance score by a point, for instance. Content that becomes irrelevant may be discarded, or "pruned," as will be discussed further herein, and therefore not analyzed. By removing irrelevant content, an analysis can increase in efficiency as opposed to an analysis of both relevant and irrelevant content, for example.

In some examples, a repository of content retrieved through crawling webpages and/or web links may be too large to analyze within a target timeframe. Relevant content can be analyzed to reduce the amount of content analyzed and the timeframe needed to analyze the content. For example, a subset of a repository of content (e.g., a number of web pages) retrieved through crawling links can be discovered (e.g., a sub-repository of web pages) so that when analytics are applied to this subset (e.g., instead of the entire set) target (e.g., desired, satisfactory, etc.) analytics results are still achieved. This can be beneficial with relation to medical text, as computational complexity involved in analyzing each webpage content can increase given that each webpage content may need to be compared against ontology graphs with a number of nodes (e.g., hundreds of thousands of nodes).

At 106, a penalty value for each of the number of webpages is determined. A penalty value, as will be discussed further herein, can be used to determine the number of webpages to be analyzed (e.g., within a target timeframe). In some examples, a smaller penalty value means an analysis can be completed with a smaller amount of content (e.g., smaller number of webpages) as compared to a larger penalty value.

At 108, a subset of the content to analyze is calculated based on the relevance and the penalty value. The subset can include the most relevant content, and can allow for analysis of the subset in a particular target timeframe, for example. The analysis can be done, for example, after relevant content (e.g., the most relevant content) is discovered.

A data tree-based model can be used to increase (e.g., maximize) an accuracy of an analytics output given the number of pages and/or content (e.g., webpages, web links) analyzed. A data tree can include a number of nodes connected to form a number of node paths, wherein one of the nodes is designated as a root node. A root node can include, for example, a topmost node in the tree. Each individual node within the number of nodes can represent a data point. The number of node paths can show a relationship between the number of nodes. For example, two nodes that are directly connected (e.g., connected with no nodes between the two nodes) can have a closer relationship compared to two nodes that are not directly connected (e.g., connected with a number of nodes connected between the two nodes).

In an example of the present disclosure, a tree-based problem can be formulated within a Breiman, Friedman, Olshen and Stone (BFOS) frame-work. The BFOS model can call for each tree to have two functionals, with one tree functional monotonically increasing and the other monotonically decreasing. This can be referred to as tree-splitting. Toward this end, a quadratic discriminant analysis (QDA) distortion of any subtree of the fully-grown tree can be viewed as a sum of two tree functionals, $u_1$ and $u_2$, such that $u_1$ is monotonically decreasing, and $u_2$ is monotonically decreasing as:

$$u_1 = R(L_i) \quad (1)$$

$$u_2 = -\sum_i p_i \log p_i, \quad (2)$$

where $p_i$ is the occurrence probability of the tree node i (e.g., the number of webpages assigned to the tree node divided by the total number of webpages), and R(L) denotes the inverse of a relevance of the link L. For example, a smaller value of $u_1$ can indicate a higher relevance of a content to a particular domain as compared to a larger value of $u_1$. A smaller value of $u_2$ can indicate a smaller penalty value and a smaller amount of content (e.g., webpages) needed for analysis, as compared to a larger value of $u_2$.

The functionals $u_1$ and $u_2$ are linear as each can be represented as a linear sum of its components in each terminal node of the tree. The monotonic decrease of $u_1$ can be due to the minimization using the Lloyd model as will be further described herein, while the monotonic increase of $u_2$ can follow Jensen's inequality and convexity (e.g., relating a value of a convex function of an integral to the integral of the convex function).

In a number of examples, the tree splitting can be followed by pruning (e.g., removing a section of a tree) based on the BFOS model. By the linearity and monotonicity of the tree functionals (1) and (2), the target (e.g., optimal) subtrees to be pruned are nested, and at each pruning iteration, a selected target subtree can be one that minimizes the sum of (1) and (2):

$$\sum_i R(l_i) + \sum_i p_i \log p_i, \quad (3)$$

at the point $$r = -\frac{\delta u_2}{\delta u_1}, \quad (4)$$

where $\delta u_i$, i=1,2, is the change of the tree functional $u_i$ from the current subtree to the pruned subtree of the current subtree and r is a ratio used to determine when to stop pruning a tree, for example. The magnitude of this ratio r can increase at each iteration. Pruning can be terminated when the magnitude of this ratio r (e.g., normalized ratio) reaches 1, resulting in the subtree minimizing:

$$\sum_i R(l_i) + \sum_i p_i \log p_i. \quad (5)$$

Figure 2A:
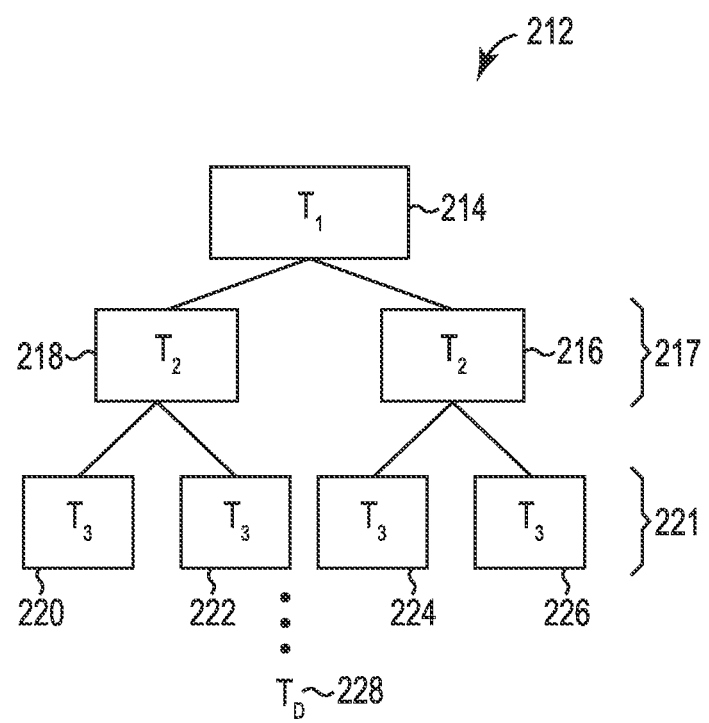
FIG. 2A is an example of a data tree structure according to the present disclosure.

FIG. 2A is an example of a data tree structure 212 according to the present disclosure. FIG. 2A illustrates, for example, how content can be discovered through crawling. Data tree 212 can start with a single node tree 214, called $T_1$, out of which two child nodes 216 and 218 are grown. The Lloyd model (e.g., grouping data points into a given number of categories) can be applied between these two child nodes 216 and 218, minimizing equation (1), and this new tree 217 can be denoted as $T_2$. Each terminal node of $T_2$ can be split. Two pairs of child nodes can be obtained (e.g., pair 220 and 222 and pair 224 and 226), and the Lloyd model can be applied between each pair, minimizing equation (1) to obtain $T_3$ 221. This procedure of splitting a tree, $T_i$, to obtain $T_{i+1}$ and running the Lloyd model between pairs of the child nodes can be repeated until i=D, (e.g., tree $T_D$ at 228) where D meets and/or exceeds a target threshold (e.g., D is sufficiently large).

Figure 2B:
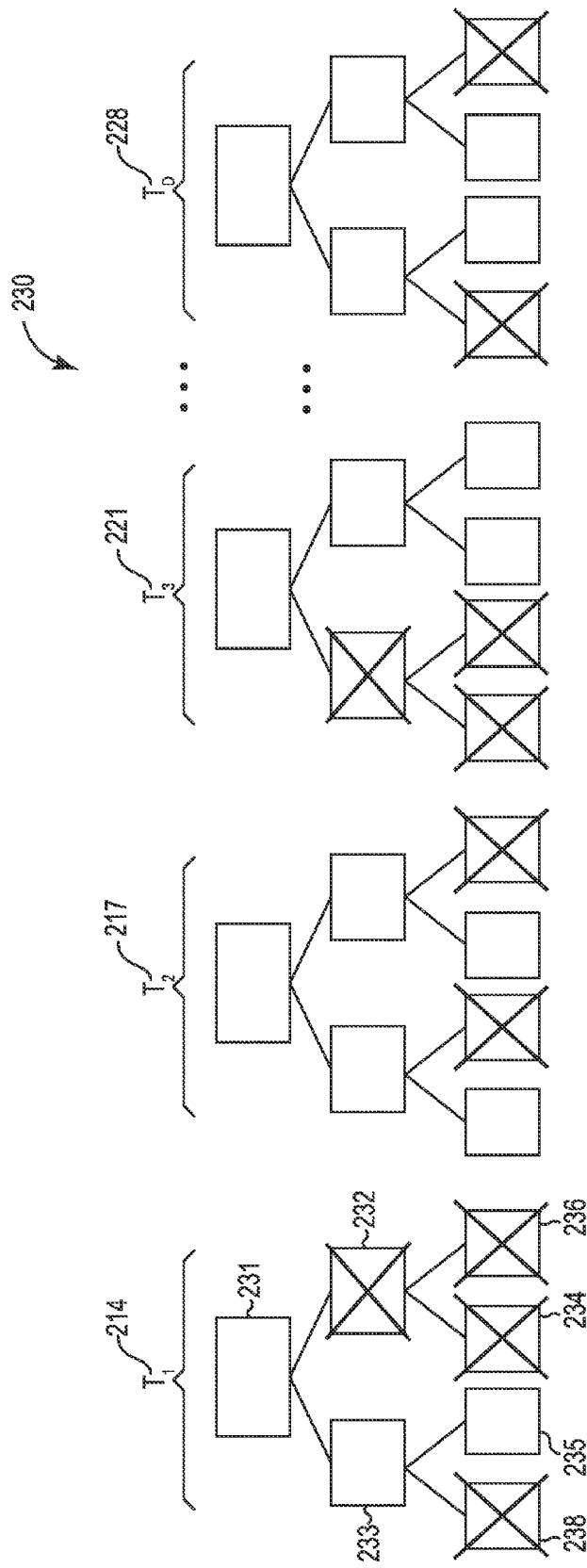
FIG. 2B is an example of a set of data tree structures according to the present disclosure.

In a number of examples, following the tree-growing, a set of fully-grown trees can be formed (e.g., a set of all subtrees within an overall tree). FIG. 2B is an example of a set 230 of data tree structures (e.g., fully-grown trees) according to the present disclosure. Set 230 can consist of D trees, $T_i$, (e.g., trees 214, 217, 221 ... 228) where $1 \leq i \leq D$. Each of the D trees, $T_i$, where $1 \leq i \leq D$, can be pruned using the BFOS model, and for each $T_i$, pruning can be stopped when the magnitude of r (after a normalization) reaches 1. For example, for each $T_i$, where $1 \leq i \leq D$, the subtree that minimizes the QDA distortion can be obtained. These subtrees can be target subtrees in the sense that the subtrees can minimize the QDA distortion. The subtrees can be denoted as $P_i$, where $1 \leq i \leq D$. The target subtree P can be selected as the subtree that minimizes a penalty term, resulting in a least amount of content that can be analyzed within a target timeframe, while still maintaining target (e.g., satisfactory, desired, etc.) analysis results. A penalty, in some examples, can be a factor that discourages too many (e.g., excess, undesired, etc.) tree leaves and/or nodes.

In the example illustrated in FIG. 2B, nodes (e.g., webpages, web links, etc.) that are covered with an "X" are pruned nodes, while other non-covered nodes are relevant, non-pruned nodes. For example, nodes 232, 234, 236, and 238 of tree 214 are pruned, while nodes 231, 233, and 235 are relevant, non-pruned nodes.

Figure 3:
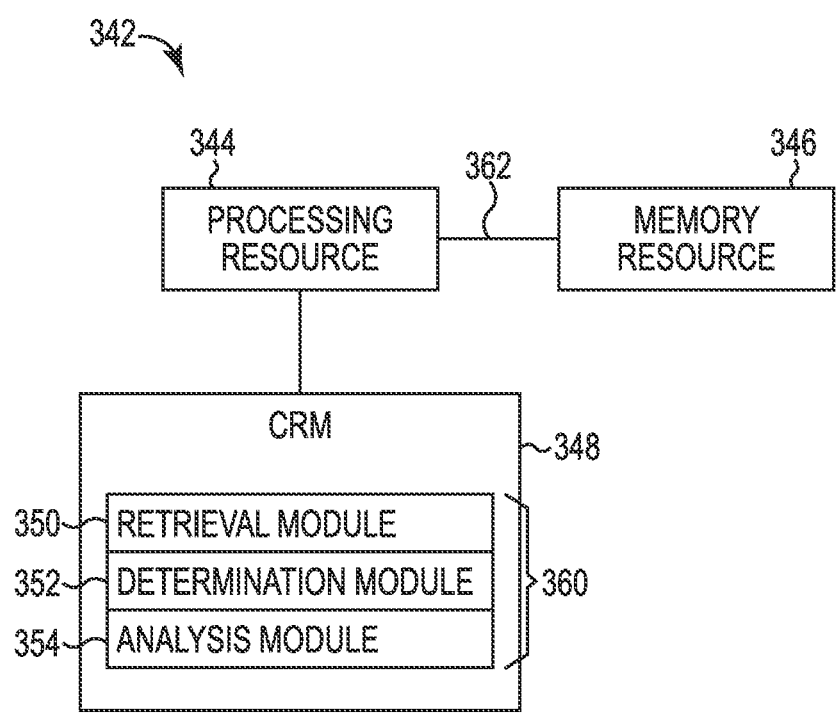
FIG. 3 illustrates an example system according to the present disclosure

FIG. 3 illustrates an example system 342 including a computing device 342 according to the present disclosure. The computing device 342 can utilize software, hardware, firmware, and/or logic to perform a number of functions.

In a number of examples, the computing device 342 can be a combination of hardware (e.g., one or more processing resources 344, computer-readable medium (CRM) 348, etc.) and program instructions (e.g., computer-readable instructions (CRI)) configured to perform a number of functions (e.g., calculating a content subset).

CRM 348 can be in communication with a number of processing resources of more or fewer than 344. The processing resources 344 can be in communication with a tangible non-transitory CRM 348 storing a set of CRI 360 executable by one or more of the processing resources 344, as described herein. The CRI can also be stored in remote memory managed by a server and represent an installation package that can be downloaded, installed, and executed. The computing device 342 can include memory resources 346, and the processing resources 344 can be coupled to the memory resources 346.

Processing resources 344 can execute CRI 360 that can be stored on an internal or external non-transitory CRM 348. The processing resources 344 can execute CRI 360 to perform various functions, including the functions described in FIGS. 1, 2A, and 2B.

The CRI 360 can include a number of modules 350, 352, and 354. The number of modules 350, 352, and 354 can include CRI that when executed by the processing resources 344 can perform a number of functions.

The modules 350, 352, and 354 can be sub-modules of other modules. For example, the retrieval module 350 and the determination module 352 can be sub-modules and/or contained within a single module. Furthermore, the number of modules 350, 352, and 354 can comprise individual modules separate and distinct from one another.

A retrieval module 350 can comprise CRI and can be executed by the processing resources 344 to retrieve a repository of content through crawling web links. For example, web links can be crawled to find webpages or other content. In a number of examples, retrieval module 350 can be utilized to browse a network, domain, World Wide Web, etc. in a methodical, automated manner to retrieve content, and/or retrieve a repository of content through crawling medical web links, webpages, and/or other sources of medical information.

A determination module 352 can comprise CRI and can be executed by the processing resources 344 to determine a sub-repository of the content that can be analyzed within a target timeframe utilizing utilizing a data tree-based model, an occurrence probability of each web link in the sub-repository, and a relevance of each web link in the sub-repository of content. A penalty value can be determined utilizing the occurrence probability, and this value can be used to determine a quantity of content to be included in the sub-repository. The quantity of content in the sub-repository may determine the time needed to analyze the sub-repository content and/or the quality of the analysis, for example.

An analysis module 354 can comprise CRI and can be executed by the processing resources 344 to analyze the sub-repository of content within the target timeframe. The sub-repository content can be analyzed in the target timeframe (e.g., depending on the domain) based on the amount of content to be analyzed. For example, a larger sub-repository may take longer to analyze than a sub-repository with less content. In a number of examples, the content to be analyzed includes medical content. This data may be analyzed to increase quality of care of a patient, for example.

In some examples, a system for calculating a content subset can include a mapping module (not shown in FIG. 3) comprising CRI executable by the processing resources 344 to map content to a particular domain. For example, medical content (e.g., text) received through crawling can be automatically mapped to a particular desired domain (e.g., a patient's medical file).

A non-transitory CRM 348, as used herein, can include volatile and/or non-volatile memory, and can be integral, or communicatively coupled, to a computing device, in a wired and/or a wireless manner. The CRM 348 can be in communication with the processing resources 344 via a communication path 362 local or remote to a machine (e.g., a computer) associated with the processing resources 344.

As used herein, "logic" is an alternative or additional processing resource to perform a particular action and/or function, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A computer-implemented method for calculating a content subset, comprising:

crawling a number of webpages for content; determining a
relevance to a particular domain of the content;

determining a penalty value for each of the number of webpages, including determining how many of the number of webpages can be analyzed within a target timeframe;

iteratively calculating, utilizing a data tree-based model, a subset of the content to analyze based on the relevance and the penalty value; and terminating the iterative calculating in response to a magnitude of a resulting ratio of the calculation reaching a threshold value.

2. The computer-implemented method of claim 1, wherein iteratively calculating the subset of the content utilizing a data tree-based model comprises: growing a number of trees of relevant webpages; splitting the number of trees into a number of subtrees; and iteratively pruning the number of subtrees to include the content to analyze.

3. The computer-implemented method of claim 2, wherein iteratively pruning the number of subtrees comprises choosing subtrees that result in a smallest penalty value.

4. The computer-implemented method of claim 2, comprising determining when to terminate pruning based on a ratio of the penalty value to the relevance.

5. The computer-implemented method of claim 1, wherein crawling comprises crawling a number of medical domains to retrieve content within medical web links.

6. The computer-implemented method of claim 1, comprising:
analyzing the subset; and mapping the analyzed subset to a target domain.

7. The computer-implemented method of claim 6, wherein mapping the analyzed subset comprises automated mapping of medical text.

8. A non-transitory computer-readable medium storing a set of instructions executable by a processing resource to:
crawl a number of webpages for content;
determine a relevance to a particular domain of the content of each of the number of webpages;
determine a penalty for each of the number of webpages utilizing an occurrence probability of each of the number of webpages and based on how many of the number of webpages can be analyzed within a target timeframe;
calculate a first subset of the content within a Breiman, Friedman, Olshen, and Stone (BFOS) model utilizing a data tree model;
iteratively calculate a second subset of the content based on the relevance and the penalty, where the second subset is a subset of the first subset;
analyze the second subset;
terminate the iterative calculation in response to a magnitude of a resulting ratio of the calculation reaching a threshold value.

9. The non-transitory computer-readable medium of claim 8, wherein the instructions executable to calculate the first subset comprise instructions executable to: utilize the data tree model to split a single node data tree into subtrees; and compare subtrees to one another utilizing a Lloyd model.

10. The non-transitory computer-readable medium of claim 9, wherein the instructions executable to iteratively calculate the second subset comprise instructions executable to utilize the data tree model to prune the subtrees of irrelevant content utilizing the BFOS model.

11. The non-transitory computer-readable medium of claim 10, wherein the instructions executable to iteratively calculate the second subset comprise instructions executable to prune the subtrees of irrelevant content until a ratio of the penalty to the relevance reaches a target value.

12. A system, comprising:
a memory resource; and
a processing resource coupled to the memory resource to implement: a retrieval module comprising computer-readable instructions stored on the memory resource and executable by the processing resource to retrieve a repository of content through crawling web links;
a determination module comprising computer-readable instructions stored on the memory resource and executable by the processing resource to determine a sub-repository of the content that can be analyzed within a target timeframe utilizing a data tree-based model, an occurrence probability of each web link in the sub-repository, and a relevance of each web link in the sub-repository of content;
an analysis module comprising computer-readable instructions stored on the memory resource and executable by the processing resource to analyze the sub-repository of content within the target timeframe;
the determination module to iteratively determine the sub-repository; and
a termination module comprising computer-readable instructions stored on the memory resource and executable by the processing resource to terminate the iterative determination in response to a magnitude of a resulting ratio of the determination reaching a threshold value.

13. The system of claim 12, wherein the determination module is configured to determine a smallest sub-repository of content that can be analyzed within the target timeframe.

14. The system of claim 12, comprising a mapping module including computer-readable instructions stored on the memory resource and executable by the processing resource to map the sub-repository of content to a target domain.

15. The system of claim 12, wherein the content that can be analyzed includes a number of webpages, wherein each webpage includes a penalty valued that is based on how many of the number of webpages can be analyzed within a target timeframe.

* * * * *

UNITED STATES PATENT AND TRADEMARK OFFICE
CERTIFICATE OF CORRECTION

PATENT NO. : 9,002,818 B2  
APPLICATION NO. : 13/755492  
DATED : April 7, 2015  
INVENTOR(S) : Mehmet Kivanc Ozonat et al.

Page 1 of 1

It is certified that error appears in the above-identified patent and that said Letters Patent is hereby corrected as shown below:

On the Title page, illustrative figure, delete "THECONTENT" and insert -- THE CONTENT --.

In the Drawings

In sheet 1 of 4, reference numeral 108, line 2, delete "THECONTENT" and insert -- THE CONTENT --, therefor.

In the Claims

In column 7, line 48, in Claim 8, delete "subset;" and insert -- subset; and --, therefor.

In column 8, line 11, in Claim 11, delete "iteratively_" and insert -- iteratively --, therefor.

In column 8, line 34 approx., in Claim 12, delete "timeframe;" and insert -- timeframe; and --, therefor.

Signed and Sealed this  
Eighth Day of September, 2015

Michelle K. Lee  
*Director of the United States Patent and Trademark Office*